United States Patent [19]
Patel

[11] Patent Number: 5,554,681
[45] Date of Patent: Sep. 10, 1996

[54] HEAT RESISTANT MULTI-COLOR TEXTURED POWDER COATINGS

[75] Inventor: Rajendra Patel, Schaumburg, Ill.

[73] Assignee: Coatings America Inc., Chicago, Ill.

[21] Appl. No.: 511,516

[22] Filed: Aug. 4, 1995

[51] Int. Cl.$^6$ .............................. C08L 83/00; C08K 3/34
[52] U.S. Cl. .................. 524/506; 524/493; 524/268; 524/449; 525/934
[58] Field of Search ............................ 524/506, 493, 524/268, 449; 525/934

[56] References Cited

U.S. PATENT DOCUMENTS

| | | | |
|---|---|---|---|
| 5,212,245 | 5/1993 | Franks et al. | 525/223 |
| 5,358,789 | 10/1994 | Kuo et al. | 428/482 |
| 5,422,396 | 6/1995 | Daly et al. | 525/106 |

*Primary Examiner*—Paul R. Michl
*Assistant Examiner*—LaVonda R. DeWitt
*Attorney, Agent, or Firm*—Banner & Allegretti, Ltd.

[57] ABSTRACT

The present invention comprises multi-color textured powder coatings comprising solid silicone resin and a mixture of polyacrylate and silica for application to exterior surfaces of a metal substrate, such as the metal substrate of cookware, bakeware, kitchen appliances, or barbecue grill, to improve the heat resistance characteristics at elevated temperatures of at least 150° F.

10 Claims, No Drawings

HEAT RESISTANT MULTI-COLOR TEXTURED POWDER COATINGS

BACKGROUND OF THE INVENTION

1. Field of the Invention

This invention relates to multi-color textured powder coatings characterized by high heat resistance of at least 150° F. for application to the exterior surface of a metal substrate, e.g. the exterior surface of a metal substrate for cookware, bakeware, barbecue grills, kitchen appliances, etc. Metal cookware and bakeware typically have an "interior" surface which comes into contact with food, and an "exterior" surface which is exposed to the heat source, such as a burner. The present invention specifically relates to multi-color textured powder coatings that can be applied to the exterior surface of cookware, or bakeware, or kitchen appliances, or any metal substrate where resistance to elevated temperatures is desired and/or required, and which provide a dramatic improvement in the heat and scratch resistance of the exterior surface. In addition, the multi-color textured coatings of the present invention cover imperfections on the exterior surface of metal substrates, thereby eliminating the need to polish or buff the exterior surface. The coatings of the present invention are so heat resistant that they will continue to adhere to the exterior surface of a metal substrate despite being subjected to high temperatures, i.e., 150° F. or more from direct and/or indirect heat, and will also be scratch resistant.

It is specifically contemplated that the coatings of the present invention can be used to coat exterior surfaces, including but not limited to exterior surfaces of cookware, bakeware, kitchen appliances, and barbecue grills where resistance to elevated temperatures is desired an/or required.

In addition, it is contemplated that the coating of the present invention can be made in a wide variety of colors and/or finishes, including multiple colors and/or patterned and/or textured finishes.

The present invention includes a multi-color textured powder coatings comprising a solid silicone resin and an acrylic flow modifier, such as a polyacrylate/silica mixture.

Particular features of the present invention include the elimination of using solvent base coatings for cookware and bakeware, thereby eliminating the problems arising from such liquid coatings. Such problems arising from liquid coatings include the dramatic reduction of volatile organic compounds and all associated problems such as safety and ease in application and disposal of hazardous waste. Thus, the present invention makes it easier for manufacturers to meet the compliance requirements of the U.S. (and the corresponding state) Environmental Protection Agency.

Moreover, the application of a powder coating is more direct and more of the non-applied coating can be reclaimed and reused for another application than in the application of a liquid coating. It is estimated that application of a powder coating is about 95–98% efficient, while the application of a liquid coatings is about 60–70% efficient. Still further, the amount of energy needed to apply and reclaim a powder coating is less than the energy needed to apply a liquid coating, because there is no need to exhaust solvent fumes and reheat the curing oven. Notably, the base cost of powder coatings is competitive with that of liquid coatings.

The present invention can be used in a wide variety of applications. For example, the present invention can be use in many types of resin systems, including those for solid silicone resins, epoxy resins, polyester systems, acrylic systems, or any other colored powder coating, and any combination thereof. It also contemplated that the present invention can be used in thermoset and thermoplastic systems.

2. Description of the Prior Art

There is a demand for cookware, bakeware, kitchen appliances, etc. for exterior surfaces that are resistant to elevated temperatures. There is further demand for coatings for these exterior surfaces which do not include porcelain or liquid paints (which have volatile organic compounds).

Liquid coatings have been used for cookware and bakeware that is typically used at elevated temperatures, i.e. 150° F. or more. These liquid coatings have been used in order to provide coatings for exterior surfaces for cookware and bakeware substrates. However, as noted above, these liquid coatings present a host of problems. Moreover, prior to the present invention, there were no similarly acceptable multi-color textured powdered coatings for cookware or bakeware that have high heat resistance at elevated temperatures of 150° F. or more.

Multi-color powdered coatings have been used in low temperature applications. For example, multi-color powdered coatings have been used as protective coatings for the surfaces of household appliances that are typically only subject to room temperature or slightly above room temperature. However, such multi-color powdered coatings would not work for cookware or bakeware that is typically used at elevated temperatures of 150° F. or more because these coatings do not have satisfactory heat and scratch resistant characteristics at elevated temperatures.

To the extent that powdered coatings containing solid silicone resin have been used in for heat resistance in high temperature applications, those powdered coatings have a "smooth" finish, but not a textured finish that gives a rich appearance and which completely covers imperfections in the exterior surface of metal substrates.

SUMMARY OF THE INVENTION

This invention relates to the use of multi-color textured powder coatings for high heat resistance, and particularly for coatings that can be applied to metal substrates to provide heat resistance and to cover imperfections on the exterior surface of metal substrates. Use of the coatings of the present invention is particularly suitable for coating the exterior surface of cookware or bakeware substrates, or similar metal substrates, resulting in high heat and scratch resistant coated surfaces that cover imperfections in the exterior surfaces of metal substrates. The present invention is a multi-color textured powder coating that is comprised of a solid silicone resin and an acrylic flow modifier, such as a polyacrylate/silica mixture, resulting in a coating for metal substrates that has high heat and scratch resistance characteristics. In the preferred embodiment of the present invention, the silicone resin is polymethyl phenyl silicone or polyphenyl silicone resin.

DETAILED DESCRIPTION OF THE PREFERRED EMBODIMENTS

Example 1

A textured coatings was made according to the present invention. Specifically, a coating having a "silver vein" appearance (Coating A) was made according to the present invention. Coating A has high heat and scratch resistance characteristics, and was made in the following manner. First, various compounds were mixed into in the following amounts according to the teachings of the present invention. The value of each component in each coating is expressed as a percentage of parts per weight ("ppw")of the coating.

| Component | Coating A (% ppw) |
|---|---|
| P-2695 | 40 |
| EPON 2002 | 40 |
| SY-430 | 3 |
| Carbon black | 1.2 |
| Blanc Fixe | 15.8 |

According to the manufacturer, DSM Corporation (Augusta, Ga.), P-2695 is a carboxyl polyester resin. More specifically, P-2695 is carboxyl terminated polyester resin with an acid value of about 60–70 mg KOH/gm. The percentage of this compound can be between 1–80%.

EPON® Resin 2002 is made by Shell Chemical Company (Houston, Tex.). According to the manufacturer, this resin is a solid bisphenol-A/epichlorohydrin epoxy resin. The Chemical Abstract Service Registry number for this resin is 25036-25-3. In the preferred embodiment, EPON® Resin 2002 is about 1 to 80% parts per weight of the coating.

The SY-430 is a hydroxy functional solid phenyl silicone resin. Hydroxyl functional methyl phenyl polysiloxane can also be used in place of SY-430. This resin is made by Wacker-Chemie GmbH of Munich, Germany. According to the manufacturer, this product is a solvent-free hydroxyl functional solid phenyl silicone resin delivered in flake form. The percentage of this compound can be between 2–90%.

The component carbon black can be between 0–10%.

According to the distributor, Sachtleben Chemic (Duisburg, Germany), Blanc fixe powder is a barium sulfate, and more specifically, a synthetic extender precipitated at a defined particle size from highly purified solutions of barium salts and sodium sulfate. The percentage of this compound can be between 0–80%.

Coating A was made by premixing and extruding the resulting chips, and then postblending with 0.3% fumed silica (preferably hydrophobic) before grinding. More specifically, at the premix stage, the raw materials listed above are mixed in a blender at medium to high speed. The premix stage provides a homogenous, dry mixing of the raw materials.

At the extruder stage, the homogenous, dry mix of the raw materials from the premix stage is fed into an extruder (i.e., single or twin screw extruder). The zones of the extruder are heated to temperatures of between 70° to 120° C., with the feed zone being cooled with the cold water circulation. The extruder stage provides the melt mix dispersion of the raw materials. The molten mass out of the extruder is then cooled through squeeze rolls and the flat ribbon of the material is further cooled on a conveyor belt before flaking.

At the postblending stage, flakes from the extruder stage are mixed with fumed silica at the desired level in the blender at low speed before grinding. The level of postblend varies between 0.1–0.5% of fumed silica.

At the grinding stage, the postblended flakes are ground by either air classifier mill or jet mill to the desired particle size.

If a "sparkle" appearance is desired in the finished product, then mica or metallic pigments or non-metallic pigments can be dry blended with the powder in the blender at low speed.

Coating A was then mixed in a blender in combination with Modarez MFB-Powder and/or PCF-7130. According to the manufacturer, Synthron Inc. (Moraganton, N.C.), Modarez MFB-Powder is an acrylic flow modifier consisting of a polyacrylate/silica mixture. According to the manufacturer, Alcan-Toyo America, Inc. (Lockport, Ill.), PCF-7130 is a non-leafing flake aluminum powder, comprising oleic acid (less than 1.0% by weight), acrylic resin (less than 15% by weight), and aluminum (less than 90% by weight).

To obtain the "silver vein" textured appearance, 20 grams of Coating A was mixed with 0.01 grams of Modarez MFB-Powder, and 0.5 grams of PCF-7130. Coating A was then mixed with Modarez MFB-Powder and PCF-7130 in the proportions noted above, and then applied to the exterior surface of a cookware pan. The result was a textured coating having high heat and scratch resistance which covered the exterior surface of the cookware pan, including all imperfections on the exterior surface of the cookware pan.

Example 2

Textured coatings having a "green vein" appearance (Coating B) can also be made according to the present invention. Like the coating described in Example 1 above, Coating B has heat and scratch resistance characteristics. Coating B was made in the Following manner. First, various compounds were mixed into in the Following amounts according to the teachings of the present invention. The value of each component in each coating is expressed as a percentage of parts per weight ("ppw")of the coating.

| Component | Coating B (% ppw) |
|---|---|
| P-2695 | 28.75 |
| EPON 2002 | 28.75 |
| SY-430 | 25.0 |
| CG-01 Green 16-2030 | 2.7 |
| Carbon black | 0.225 |
| RCL-60 TiO$_2$ | 0.275 |
| Blanc Fixe | 14.3 |

According to the manufacturer, DSM Corporation (Augusta, Ga.), P-2695 is a carboxyl polyester resin. More specifically, P-2695 is carboxyl terminated polyester resin having an acid value of about 60–70 mg KOH/gm. The percentage of this compound can be between 1–80%.

EPON® Resin 2002 is made by Shell Chemical Company (Houston, Tex.). According to the manufacturer, this resin is a solid bisphenol-A/epichlorohydrin epoxy resin. The Chemical Abstract Service Registry number for this resin is 25036-25-3. In the preferred embodiment, EPON® Resin 2002 is about 1 to 80% parts per weight of the coating.

The SY-430 is a hydroxy functional solid phenyl silicone resin. Hydroxyl functional methyl phenyl polysiloxane can also be used in place of SY-430. This resin is made by Wacker-Chemie GmbH of Munich, Germany. According to the manufacturer, this product is a solvent-free hydroxyl functional solid phenyl silicone resin delivered in flake form. The percentage of this compound can be between 2–90%.

CG-01 Green 16-2030 is made by Hoechst Celanese (Coventry, R.I.). This component is phathlocyanine green. This component can be between 0–10%.

The component carbon black can be between 0–10%.

According to the manufacturer, SCM Chemcials (Baltimore, Md.), RCL-9 is $TiO_2$. The percentage of this compound can be between 0–60%.

According to the distributor, Sachtleben Chemie (Duisburg, Germany), Blanc fixe powder is a barium sulfate, and more specifically, a synthetic extender precipitated at a defined particle size from highly purified solutions of barium salts and sodium sulfate. The percentage of this compound can be between 0–80%.

The above Coating B was made in the same manner as outlined in Example 1 for Coating A.

If a "sparkle" appearance is desired in the finished product, then mica or metallic pigments or non-metallic pigments can be dry blended with the powder in the blender at low speed.

Coating B can also be mixed in a blender as necessary in combination with Modarez MFB-Powder and/or PCF-7130. According to the manufacturer, Synthron Inc. (Moraganton, N.C.), Modarez MFB-Powder is an acrylic flow modifier. According to the manufacturer, Alcan-Toyo America, Inc. (Lockport, Ill.), PCF-7130 is a non-leafing flake aluminum powder, comprising oleic acid (less than 1.0% by weight), acrylic resin (less than 15% by weight), and aluminum (less than 90% by weight).

To obtain the "green vein" textured appearance, 20 grams of Coating B was mixed with 0.01 grams of Modarez MFB-Powder, and 0.5 grams of PCF-7130. FIG. 4 shows a cookware pan after Coating B has been mixed with Modarez MFB-Powder and PCF-7130 in the proportions noted above, and then applied to the cookware pan. The result was a textured coating having high heat and scratch resistance which covered the exterior surface of the cookware pan, including all imperfections on the exterior surface of the cookware pan.

The foregoing embodiments of the present invention demonstrate that there are alternative amounts of silicone resin and other components. These amounts of silicone resin and other components may vary depending on the application and will be recognized by those skilled in the art.

The foregoing detailed description of the invention has been made in general terms and with respect to several preferred embodiments. Many of the preferred embodiments stated herein may be varied by persons skilled in the art without departing from the spirit and scope of the present invention as set forth in the following claims and equivalents. Solid silicone resin may be used with any other resin system to increase the heat and/or scratch resistance. For example, the coatings of the present invention can be used in resin systems involving acrylics, polyurethanes, polyesters, epoxys, etc.

What is claimed is:

1. A multi-colored textured powder coating characterized by high heat resistance of at least 150° F. for the application to the exterior surface of a metal substrate, the multi-colored textured powder coating comprising a solid silicone resin and a mixture of polyacrylate and silica, wherein the solid silicone resin first undergoes extrusion and grinding that results in a powder of solid silicone resin, and the mixture of polyacrylate and silica is then added to the powder of solid silicone resin.

2. The textured powder coating of claim 1 wherein the solid silicone resin is polymethyl phenyl silicone resin.

3. The textured powder coating of claim 1 wherein the solid silicone resin is polyphenyl silicone resin.

4. The coating of claim 1 which is characterized by high scratch resistance.

5. The coating of claim 1, wherein the coating also comprises a solid epoxy resin, a solid polyester resin, a solid acrylic resin, mica, and metallic and non-metallic pigments.

6. A coated metal substrate having the coating of claim 1.

7. A coated metal substrate having the coating of claim 2.

8. A coated metal substrate having the coating of claim 3.

9. A coated metal substrate having the coating of claim 4.

10. A coated metal substrate having the coating of claim 5.

* * * * *